(No Model.)

C. H. WEEDEN.
CAR FENDER.

No. 582,562.  Patented May 11, 1897.

Witnesses
Victor Sanvakt
Laura De Loria

Inventor
Charles H. Weeden
by Henry Chadbourn
his Atty.

UNITED STATES PATENT OFFICE.

CHARLES H. WEEDEN, OF NEW SWEDEN, MAINE.

CAR-FENDER.

SPECIFICATION forming part of Letters Patent No. 582,562, dated May 11, 1897.

Application filed April 27, 1896. Serial No. 589,203. (No model.)

*To all whom it may concern:*

Be it known that I, CHARLES H. WEEDEN, of New Sweden, in the county of Aroostook and State of Maine, have invented certain new and useful Improvements in Car Fenders or Guards, of which the following, taken in connection with the accompanying drawings, is a specification.

This invention relates to improvements in car fenders or guards to be attached to the front of an electric, cable, or other car propelled by other means than by horses; and the object of the invention is to provide means whereby a person or other object run into by the car will be prevented from going under the car and from being crushed, thus preserving the life of the person.

The invention consists of the combination, arrangement, and operation of the various devices, as will be fully described hereinafter and claimed; and the invention is carried out substantially as illustrated on the accompanying drawings, which form an essential part of this specification, and whereon—

Figure 1:
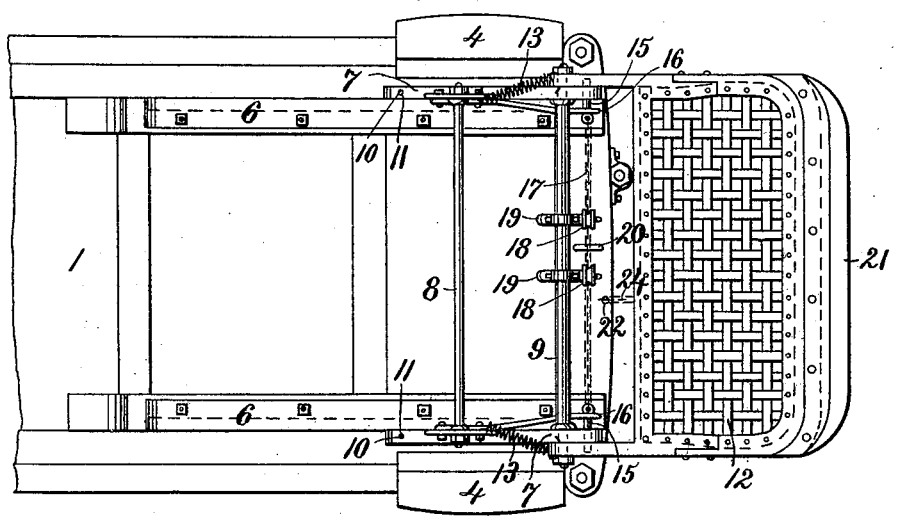
Figure 2:
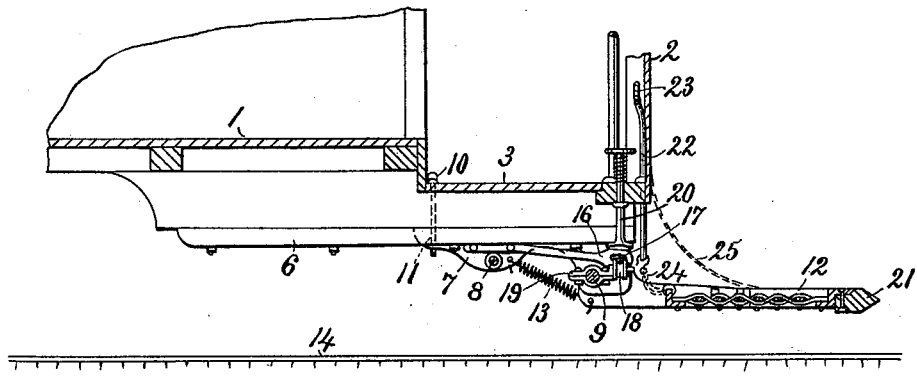
Figure 3:
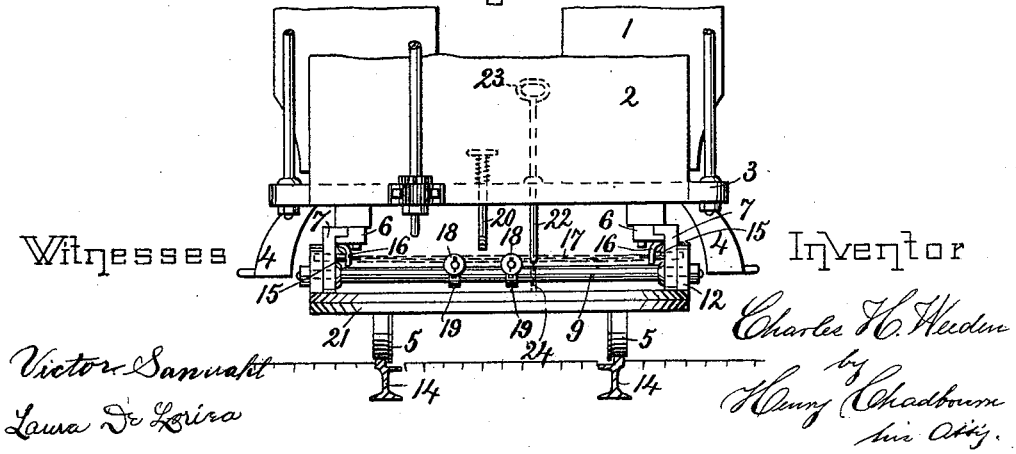

Figure 1 represents a bottom view of one end of a car provided with a fender made in accordance with my invention. Fig. 2 represents a longitudinal section of the same. Fig. 3 represents a partial front elevation of the same.

Like characters refer to like parts wherever they occur on the different parts of the drawings.

The body 1, dasher 2, platform 3, steps 4 4, and wheels 5 5 of the car may be of any of the well-known constructions, and necessary changes and variations in the construction and arrangement of the fender to adjust it to the various forms of cars come within the scope of my invention.

To the under part of the body of the car are secured the guides 6 6, and within said guides are movably mounted the side pieces 7 7, which side pieces are firmly held together or in the same relative positions one to the other by means of the cross-rods 8 and 9. Thus it will be seen that the side pieces 7 and the cross-rods 8 and 9 form a framework which is movable forward or backward within the guides 6.

Pins or bolts 10 pass loosely through perforations in the platform and enter perforations 11 in the side pieces to hold said pieces in their forward or backward position, to be described hereinafter, according to whether the fender is to be held in operative position or not.

To the forward end of the side pieces, and preferably upon the projecting ends of the cross-rod 9, is pivotally mounted the fender proper, 12, which, as shown on the drawings, consists of a flat latticework-platform, but it may consist of a solid platform or one made of rope-netting, and it may be made in other shapes than perfectly flat, as shown—as, for instance, it might be made convexed, concaved, or in a double-curved form, as desired. Springs 13, attached to the fender and to the side pieces of the framework, tend to turn the fender on its fulcrum and so force its forward end downward against the track 14 or roadbed. Pins or bolts 15 15 play loosely through perforations in the side pieces 7 and enter perforations or recesses in the frame of the fender 12, so as to hold said fender in its raised position above the track, or as shown in the drawings, and against the influence of the springs 13. These pins or bolts are acted upon by means of the flat springs 16, which tend to normally hold them within the recesses in the frame of the fender and therefore hold said fender in its raised position.

The pins 15 are connected by means of the cord or chain 17, which is attached at each end to one of said bolts, said chain in its passage from one bolt to the other passing over the rolls 18, which rolls are loosely mounted upon bearing on the brackets 19, attached to the front rod 9 or to some other part of the sliding framework. A spring-pressed push-pin 20 passes loosely through the platform of the car and has its lower end directly above the chain 17. The action of this push-pin upon the chain, when said pin is forced downward against the influence of its actuating-spring, is to force the chain downward between the rolls, causing a bight to be made in the chain which will withdraw the locking-bolts 15 from the recesses in the frame of the fender and therefore allow the springs 13 to turn the fender on its fulcrum and therefore move and hold the outer end of the fender downward against the track.

The front of the fender is provided with the rubber or other elastic cushion 21, which is firmly attached to the fender and is of such a shape that it will come into contact with the road-bed before any other and metallic part of the fender touches the track, and, in fact, prevents the metallic frame of the fender from coming into contact with the track at any time. This cushion also presents a yielding surface to come in contact with the person or the object on the track, and consequently cushions the blow received by the person or other object and is less liable to break the bones of the person or to injure him as badly as it would if said cushion were not used.

In order to raise the fender to its normal position after it has been allowed to drop against the track, I provide the platform of the car with the sliding rod 22, which is provided at its upper end with a handle 23. This rod is movable up and down within a perforation in the platform and is connected at its lower end to the frame of the fender by means of a short chain 24 or other flexible connection, which chain is preferably permanently attached to the fender, but detachably attached to the rod, it being provided with a hook which is hooked into a perforation in the rod, for a purpose to be described hereinafter.

It will be seen that if the fender is in such a position that its forward end rests upon the track it can be raised to the position shown on the drawings by drawing upward on the rod 22, and as the bolts 15 are pressed outward by the action of the springs 16 it will be seen that when the fender has been raised to the position shown on the drawings said bolts will automatically enter the recesses in the frame of the fender and lock the fender in its raised position.

If so desired, the car may be provided with a netting 25, (shown in dotted lines in Fig. 2,) which is attached at its upper end to the front of the dasher of the car and at its lower end to the fender 12 a short distance in front of the dasher, so as to cause the netting to further prevent a person from being injured when run down by the car.

Each end of the car is to be provided with a fender, as shown on the drawings, and when the fender is on the rear end of the car and not required for use the pins or bolts 10 are raised, the chain 24 is disconnected from the rod 22, and the framework, with its attached fender, is pushed under the car out of the way. I wish it to be understood, however, that it is not absolutely necessary that the fender should be pivotally attached to a sliding framework, as it might be so attached to some stationary part of the car without departing from my invention.

The operation of my improved fender is as follows: The fender being in its normal position, or as shown on the drawings, and the car moving on the rails, if the driver or motorman sees that there is danger of an accident to a person or an object on the track he depresses the push-pin 20 with his foot, thus withdrawing the bolts 15 and allowing the springs 13 to force the fender downward against the track. If there is a small object on the track, the elastic cushion will allow the fender to pass over it, but if there is a large object on the track it will be prevented from going under the fender and car, but will be taken upon the fender and carried forward with the car. When it is desired to again raise the fender from the track into its normal position, the driver or motorman draws upward upon the rod 22 and thereby raises the fender until the bolts 15 automatically enter the recesses in the frame of the fender and lock it in its normal position, as above described.

It will be understood that the exact shape of the fender proper, as shown on the drawings, may be varied to suit the shape of the car or the amount of surface to be contained in the fender, and I do not wish to confine myself in this respect to any particular shape of fender.

Having thus fully described the nature, construction, and operation of my invention, I wish to secure by Letters Patent and claim—

1. In a car fender or guard, guides 6, 6, on the under side of the car, a framework consisting of side pieces 7, 7, and connecting-rods between the same, said framework movable forward and backward in said guides, a fender proper 12 pivoted to the side pieces 7 7, springs 13 13 attached to said fender and side pieces tending to hold the forward end of the fender against the track with a yielding pressure, spring-pressed bolts 15 15 carried by said framework and entering perforations in the fender to hold the fender raised from the track, a flexible connection 17 between said bolts, and a spring-pressed push-pin 20 projecting downward through the platform of the car, detached from said flexible connection but engaging it when said push-pin is pressed downward to withdraw the bolts 15 and allow the fender 12 to be moved downward upon the track, all combined for the purpose set forth.

2. In a car fender or guard, guides 6, 6, on the underside of the car, a framework guided in said guides and consisting of the side pieces 7 7 and connecting-rods between the same, pins 10 10 to hold said framework in its forward position, a fender proper 12 pivotally attached to the side pieces of said framework, spring-pressed bolts 15 15 carried on the framework and entering perforations in the fender to hold the fender in its raised position above the track, a yielding flexible connection 17 between the bolts 15 15 and a push-pin 20 projecting through the platform of the car immediately above but detached from said flexible connection to withdraw said bolts when said pin is depressed, all combined to operate substantially as and for the purpose set forth.

In testimony whereof I have signed my name to this specification, in the presence of two subscribing witnesses, on this 24th day of April, A. D. 1896.

CHARLES H. WEEDEN.

Witnesses:
 HENRY CHADBOURN,
 VICTOR SANDAHL.